United States Patent [19]

Ito

[11] Patent Number: 4,831,356

[45] Date of Patent: May 16, 1989

[54] THEFT PREVENTION DEVICE FOR AUTOMOBILES

[75] Inventor: Hideo Ito, Fujisawa, Japan

[73] Assignee: Shiroki Kinzoku Kogyo Kabushiki Kaisha, Fujisawa, Japan

[21] Appl. No.: 226,574

[22] Filed: Aug. 1, 1988

[30] Foreign Application Priority Data

Jul. 30, 1987 [JP] Japan ................. 62-191151

[51] Int. Cl.$^4$ ............................................. B60R 25/00
[52] U.S. Cl. ................................... 340/426; 307/10.2
[58] Field of Search ................ 340/63, 64, 541, 545, 340/549; 307/10 AT; 200/61.93

[56] References Cited

U.S. PATENT DOCUMENTS

| 3,513,466 | 5/1970 | Isaacs et al. ............ 340/64 X |
| 4,323,878 | 4/1982 | Luzynski ................. 340/63 |
| 4,538,135 | 8/1985 | Turner ................... 340/63 |
| 4,595,903 | 6/1986 | Arlasky et al. ........... 340/64 |

Primary Examiner—Joseph A. Orsino
Assistant Examiner—Jeffery A. Hofsass
Attorney, Agent, or Firm—Schwartz & Weinrieb

[57] ABSTRACT

An automobile theft prevention device has an idle swing mechanism including first, second, and third levers. The first and second levers are coaxially coupled to each other for angular movement and connected between an engine hook lock and an engine hood lever for opening the engine hood. The third lever is actuatable by means of a solenoid for in turn moving a connecting pin loosely fitted within slots defined respectively within the first and second levers. When an automobile door is locked, the solenoid is energized so as to move the connecting pin disposed within the slots into a position where the first lever is idly movable with respect to the second lever. Thus, the engine hood cannot be opened even if the engine hood lever is operated. The connecting pin can be moved back to its original position so as to connect the first and second levers only when the door is unlocked properly as by, for example, by means of a key for the door. Therefore, the engine hood cannot be opened even when unauthorized entry is gained by breaking a window glass panel and the engine hood lever is operated, unless the door is unlocked properly. If the engine hood lever is operated while the door is locked, an alarm is produced so as to signal the unauthorized attempt to open the engine hood.

19 Claims, 6 Drawing Sheets

THEFT PREVENTION DEVICE FOR AUTOMOBILES

FIELD OF THE INVENTION

The present invention relates to a theft prevention device for an automobile, and more particularly to an automobile theft prevention device for producing an alarm when the engine hood of the automobile is opened, unless a door of the automobile that has been locked through means of a predetermined procedure is unlocked using a proper means such as, for example, a key to the door lock or the like.

BACKGROUND OF THE INVENTION

Known automobile theft prevention devices are set or activated when an automobile door is locked through means of a predetermined procedure, for example, by using a key to the door lock or closing the door after the inside knob thereof is depressed (keyless locking). When the engine hood of the automobile is opened while the theft prevention device is in an activated state, the theft prevention device produces an alarm sound. For example, if a thief breaks a window glass panel, enters the automobile, and operates the engine hood lever so as to open the engine hood, then the theft prevention device produces an alarm. When a door is unlocked using a proper means such as, for example, a key to the door, the theft prevention device is inactivated, and no alarm is generated by opening the engine hood thereafter.

The conventional automobile theft prevention devices, however, do not prevent the engine hood from being opened at any time by operating the engine hood lever located within the passenger compartment. Therefore, unauthorized entry into the passenger compartment of an automobile which is equipped with an automobile theft prevention device of the type described, and subsequent operation of the engine hood lever so as to open the engine hood would involve the same theft procedures as would similarly be conducted in connection with an automobile having no such automobile theft prevention device incorporated therein, the only difference being that an alarm is generated when the engine hood is opened. If the alarm was ignored by the thief, therefore, parts in the engine compartment could still be stolen.

OBJECTS OF THE INVENTION

It is therefore an object of the present invention to provide a theft prevention device for an automobile wherein the engine hood of the automobile is prevented from being opened even by operating the engine hood lever, unless a door of the automobile that has been locked by means of a predetermined procedure is initially unlocked by a proper means such as, for example, a key to the door.

Another object of the present invention is to provide a theft prevention device for an automobile which will generate an alarm when the engine hood lever is operated regardless of whether the engine hood of the automobile is opened or not, unless a door of the automobile that has been previously locked by means of a predetermined procedure is initially unlocked by a proper means such as, for example, a key to the door.

Still another object of the present invention is to provide a theft prevention device of a relatively simple structure for an automobile which will prevent the engine hood of the automobile from being opened even by operating the engine hood lever, unless a door of the automobile that has been previously locked by means of a predetermined procedure is unlocked by a proper means such as, for example, a key to the door.

SUMMARY OF THE INVENTION

According to the present invention, there is provided a theft prevention device in an automobile having a lockable and unlockable door, unlocking means for unlocking the door, an engine hood, a hood lock for locking the engine hood, and an engine hood lever for opening the engine hood, the theft prevention device comprising: an idle swing mechanism comprising a first pivotable lever having a substantially L-shaped slot defined within one end thereof and extending radially of and circumferentially about the center of pivotal movement of the first lever, the first lever having an opposite end operatively coupled to either one of the hood lock or the engine hood lever, a second pivotable lever disposed coaxially with the first lever and having a slot defined therein in registry with a radial portion of the L-shaped slot in the first lever, the second lever having an opposite end operatively coupled to the other one of the hood lock and the engine hood lever, a connecting pin loosely disposed within the slots defined within the first and second levers and connecting the first and second levers together, and a third lever operatively associated with a connecting pin for moving the connecting pin radially within the slots defined within the first and second levers in response to locking and unlocking operations for the door; means responsive to the locking of the door for actuating the third lever so as to move the connecting pin into a bent portion of the slot defined within the first lever in order to allow the first and second levers to be operatively disconnected from each other so as to swing idly with respect to each other in an idle swing position for interrupting the operating force from the engine hood lever; a first sensor for detecting the operation of the engine hood lever; a second sensor for detecting the idle swing position; and an alarm producing circuit for producing an alarm in response to signals from the first and second sensors.

BRIEF DESCRIPTION OF THE DRAWINGS

The above and other objects, features and advantages of the present invention will become more apparent from the following description taken in conjunction with the accompanying drawings in which a preferred embodiment of the present invention is shown by way of illustrative example, and wherein.

DETAILED DESCRIPTION OF THE PREFERRED EMBODIMENT

Figure 1:
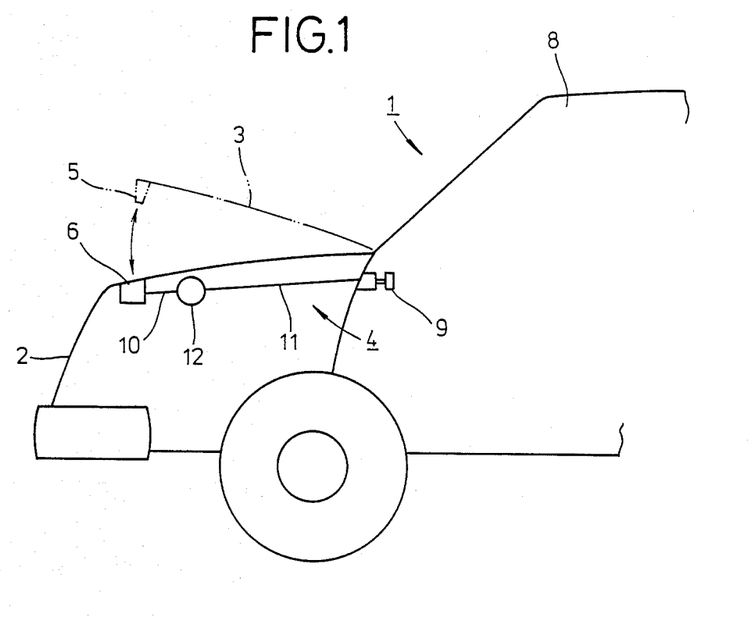
FIG. 1 is a fragmentary view showing a mechanical arrangement of an automobile theft prevention device according to an embodiment of the present invention.

As shown in FIG. 1, an automobile 1 has an engine compartment 2 which houses therein a hood opening device 4 for opening an engine hood 3. The hood opening device 4 comprises a striker 5 mounted upon the free end of the engine hood 3, and a hood lock 6 mounted within the engine compartment 2 for engaging the striker 5. The striker 5 and the hood lock 6 are of known structure and will not be described in detail.

The engine hood 3 can be opened by means of an engine hood lever 9 disposed inside a passenger compartment 8. An idle swing mechanism 12 shown in FIGS. 2 through 5 is positioned between the engine hood lever 9 and the hood lock 6. The idle swing mechanism 12 comprises a base 13, a first lever 14, a second lever 15, and a third lever 16, all produced by pressing techniques performed upon steel sheets. The first lever 14 has an end 14a which is operatively coupled through means of a wire cable 11 to the engine hood lever 9 which is positioned within the passenger compartment 8 within the vicinity of the driver's seat. The first lever 14 can thus be angularly moved by operating the engine hood lever 9. The second lever 15 has an end which is 15a operatively coupled through means of a wire cable 10 to a locking lever (not shown) of the hood lock 6 disposed within the engine compartment 2. The hood lock 6 can be released so as to unlock the striker 5 by angularly moving the second lever 15. The first and second levers 14, 15 are pivotally connected to the base 13 by means of a pin 17. The third lever 16 is pivotally attached to the base 13 by means of a pin 18. The other end 14b of the first lever 14 has a substantially L-shaped slot 19 defined therein which extends radially of and circumferentially around the pin 17. The other end 15b of the second lever 15 has a slot 21 defined therein which is registry with the radial portion of the L-shaped slot 19 defined within the first lever 14. The third lever 16 has a slot 22 defined therein and extending arcuately substantially around the pin 17, the slot 22 parely overlapping the slots 19 and 21 of the first and second levers.

Figure 2:
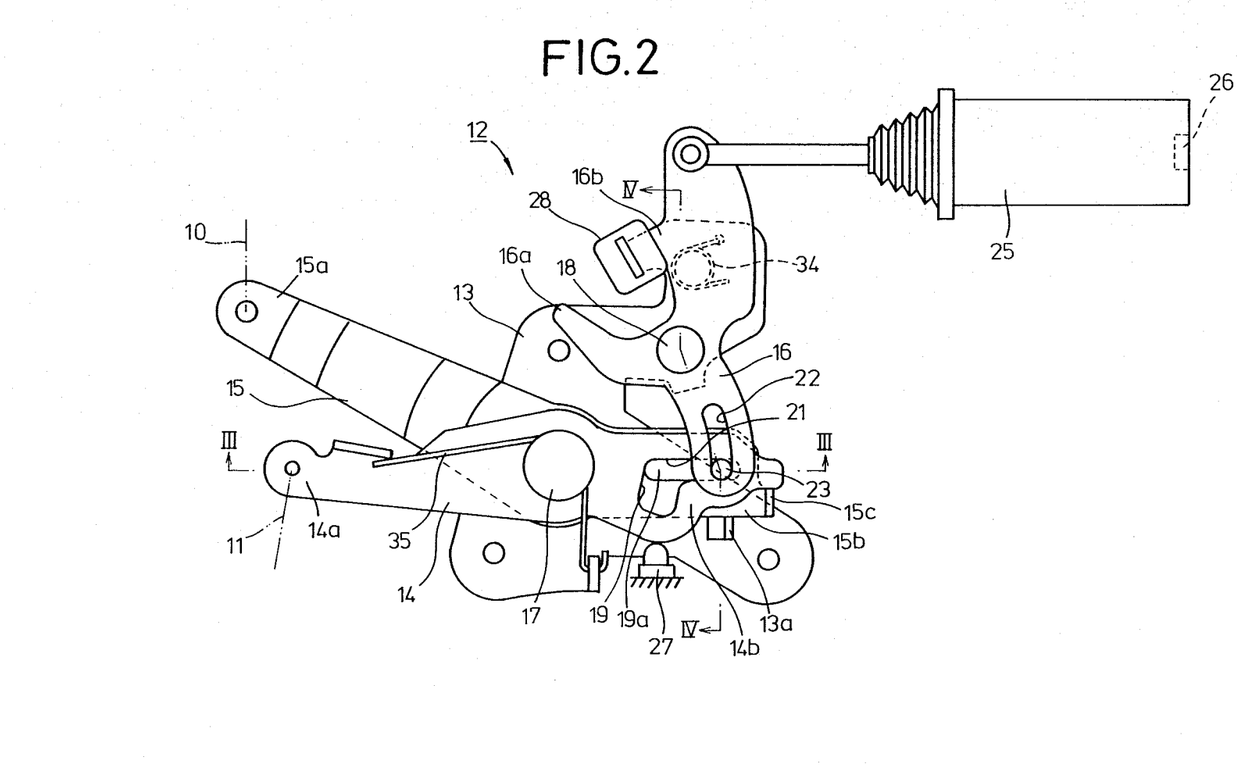
FIG. 2 is a front elevational view of an idle swing mechanism in the automobile theft prevention device shown in FIG. 1.
Figure 3:
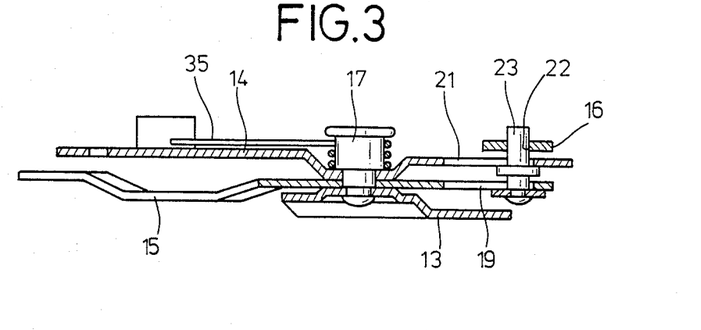
FIG. 3 is a cross-sectional view taken along line III—III of FIG. 2.
Figure 4:
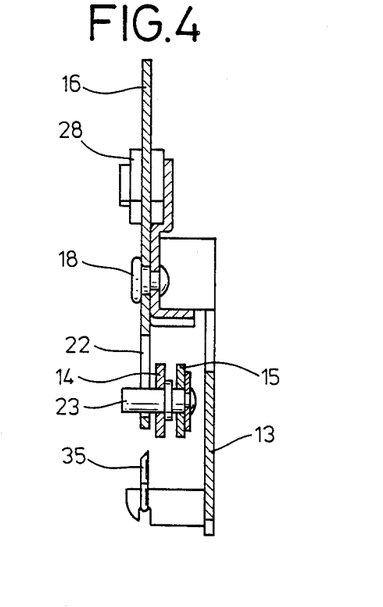
FIG. 4 is a cross-sectional view taken along line IV—IV of FIG. 2.
Figure 5:
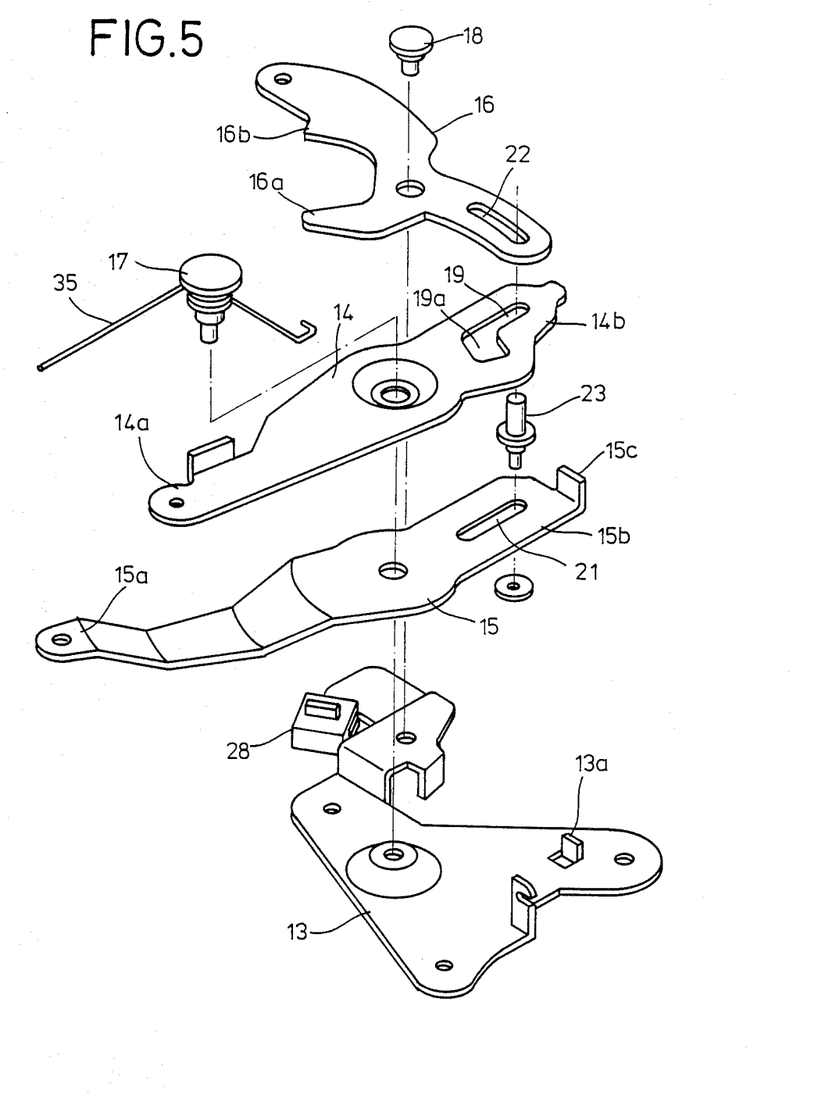
FIG. 5 is a fragmentary exploded perspective view of the idle swing mechanism.

A connecting pin 23 is movably disposed within these slots 19, 21, 22. The connecting pin 23 serves to transmit an operating force acting upon the first lever 14 to the second lever 15. By moving the connecting pin 23 into a bent portion 19a of the slot 19 defined within the first lever 14, the transmission of operating force from the first lever 14 to the second lever 15 can be interrupted. The connecting pin 23 can be moved by rotating the third lever 16 about the pin 18. The slot 22 defined within the third lever 16 serves as a guide path of the connecting pin 23 when the operating force is transmitted from the first lever 14 to the second lever 15.

The third lever 16 is operatively joined to the plunger of a solenoid 25 which serves as an actuator therefor. The solenoid 25 is energized by means of current of a particular polarity as a result of the locking of a door of the automobile by means of a predetermined procedure. When the solenoid 25 is energized, the third lever 16 is rotated clockwise as seen in FIG. 2 until an arm 16a thereof abuts against a stopper 28. When the door is unlocked by a proper means such as, for example, a key to the door, current of an opposite polarity flows through the solenoid 25 so as to energize the same for thereby rotating the third lever 16 in the counterclockwise direction as seen in FIG. 2 until an arm 16b thereof abuts against an opposite side of the stopper 28, whereupon the third lever 16 returns to the position shown in FIG. 2. The third lever 16 returns by means of a snap action under the resiliency of a spring 34 which is interposed between the third lever 16 and the base 13 and which has one end thereof engaging the third lever 16 and the other end thereof engaging the base 13.

A spring 35 is loosely fitted over the pin 17 and has one end thereof engaging the base 13 and the other end thereof engaging the first lever 14 so as to normally bias the first lever 14 in the clockwise direction. With the first lever 14 thus resiliently biased, the first lever 14 engages a bent portion 15c of the second lever 15, which in turn engages a bent portion 13a of the base 13.

Figure 6:
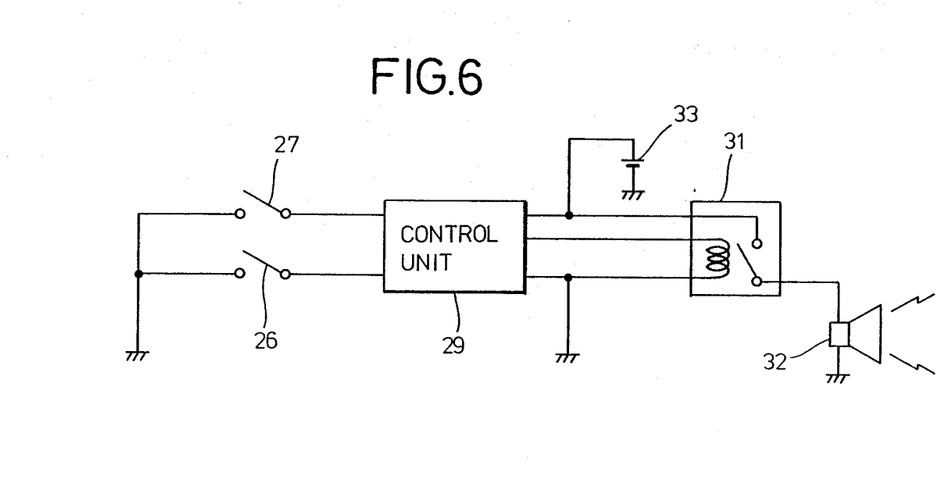
FIG. 6 is a block diagram of an electrical arrangement of the automobile theft prevention device.

A first sensor 26 comprising a reed switch, a proximity switch, or the like is positioned at the end of the stroke of the solenoid 25. A second sensor 27 is mounted upon the base 13 for detecting the operation of the first lever 14. The second sensor 27 also comprises a reed switch, a proximity switch, or the like. The first sensor 26 may alternatively be positioned where the stopper 28 and the third lever 16 abut against each other, for detecting the operation of the solenoid 25. Output signals from the first and second sensors 26, 27 are sent to a control unit 29 (FIG. 6) which is disposed within an alarm producing circuit. To the control unit 29, there is connected a power relay 31 for turning an alarm unit 32 ON and OFF, and a battery 33. The control unit 29 may be part of a computer within a controller for controlling the engine of the automobile, or a sequence control circuit.

Figure 7:
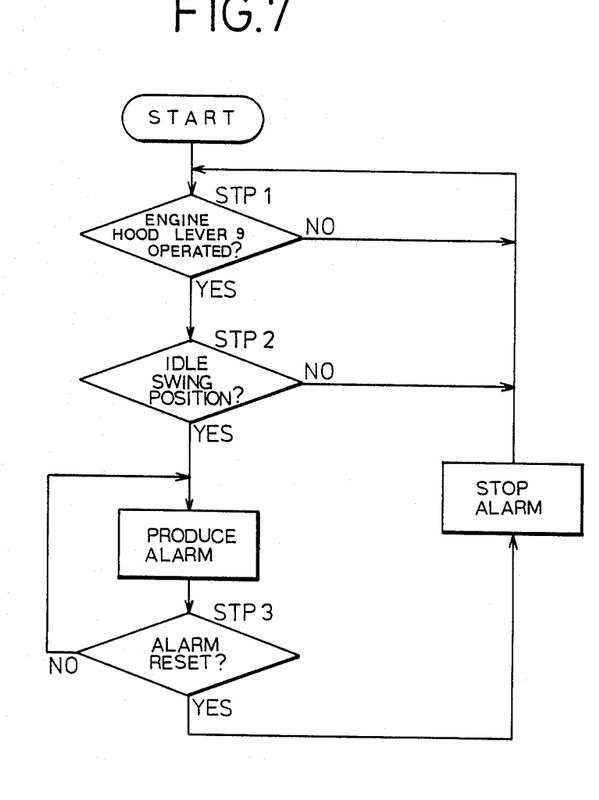
FIG. 7 is a flow chart of an operational sequence of the automobile theft prevention device.

An operational sequence of the control unit 29 will now be described with reference to FIG. 7.

When a door of the automobile has been locked by means of a predetermined procedure, the control unit 29 executes the following steps:

Step 1

The control unit 29 monitors whether there is a signal from the second sensor 27 or not (that is, whether the engine hood lever 9 has been operated or not). If operation of the first lever 14 (that is, operation of the engine hood lever 9) is detected, then the control unit 29 goes to the next step 2. If operation of the hood lever 9 is not detected, the control unit 29 continues to monitor the second sensor 27.

Step 2

The control unit 29 reads an output signal from the first sensor 26 so as to check whether the idle swing mechanism 12 is disposed in an idle swing position, that is, in a position to allow the first lever 14 to idly swing with respect to the second lever 15 because the connecting pin 23 is positioned within the bent portion 19a of the L-shaped slot 19. If the idle swing mechanism 12 is disposed within the idle swing position, the control unit 29 energizes the alarm unit 32 through means of the power relay 31 so as to produce an alarm. If the output signal from the first sensor 26 indicates that the idle swing mechanism 12 is not disposed within the idle swing position, then no alarm is produced, and control goes back to step 1.

Step 3

If an alarm reset switch (not shown) is operated after the alarm has been generated, the alarm is stopped and control returns to step 1. If the alarm reset switch is not operated, the alarm is continuously generated.

With the aforesaid arrangement, the engine hood cannot be opened once the door is locked by means of the proper procedure, unless the door is unlocked by a proper means such as for example a key to the door. If the engine hood lever 9 is operated while the door remains unlocked, an alarm is produced so as to signal the unauthorized entry into the automobile.

While the engine hood lever 9 and the first lever 14 is interconnected by means of the wire cable 11 and the second lever 15 and the hood lock 6 are interconnected by means of the wire cable 16 in the illustrated embodiment, the engine hood lever 9 and the second lever 15 may be interconnected by means of a wire cable and the first lever 14 and the hood lock 7 may be interconnected by means of a wire cable.

As described above, the automobile theft prevention device of the present invention prevents the engine hood from being opened even by operating the engine hood lever unless the door which has been previously locked by means of the predetermined procedure is first unlocked by a normal means such as, for example, a key to the door, and generates an alarm when the engine hood lever is operated while the door is in its locked state.

Although a certain preferred embodiment has been shown and described, it should be understood that many changes and modifications may be made therein without departing from the scope of the appended claims.

What is claimed is:

1. A theft prevention device in an automobile having a lockable and unlockable door, unlocking means for unlocking said door, an engine hood, a hood lock for locking said engine hood, and an engine hood lever for opening said engine hood, said theft prevention device comprising:
    an idle swing mechanism comprising a first pivotable lever having a substantially L-shaped slot defined in one end thereof and extending radially of and circumferentially about a center of pivotal movement of said first lever, said first lever having an opposite end operatively coupled to either one of said hook lock or said engine hood lever, a second pivotable lever disposed coaxially with respect to said first lever and having a slot defined therein which overlaps a radial portion of said L-shaped slot defined within said first lever, said second lever having an opposite end operatively coupled to the other one of said hood lock or said engine hood lever, a connecting pin loosely fitted within said slots defined within said first and second levers and connecting said first and second levers together, and a third lever connected to said connecting pin for moving said connecting pin radially within said slots defined within said first and second levers in response to locking and unlocking of said door;
    means responsive to locking of said door for actuating said third lever so as to move said connecting pin into a bent portion of said slot defined within said first lever in order to allow said first and second levers to swing idly with respect to each other in an idle swing position for interrupting the transmission of an operating force from said engine hood lever to said engine hood lock;
    a first sensor for detecting operation of said engine hood lever;
    a second sensor for detecting said idle swing position; and
    an alarm producing circuit for producing an alarm in response to signals generated by said first and second sensors.

2. A theft prevention device according to claim 1, wherein said means comprises a solenoid having a plunger coupled to said third lever.

3. A theft prevention device according to claim 2, wherein said second sensor is positioned to detect movement of the plunger of said solenoid.

4. A system as set forth in claim 1, wherein:
    said first and second sensors comprise proximity switches.

5. A system as set forth in claim 1, wherein:
    said first and second sensors comprise reed switches.

6. A theft prevention system for an automobile having a door, an engine hood, means for locking and unlocking said door, means for locking said engine hood, and an engine hood lever for operating said engine hood locking means so as to open said engine hood, comprising:
    first lever means having a first end operatively coupled to said engine hood locking means;
    second lever means having a first end operatively coupled to said engine hood lever;
    connecting means, movable between two positions, for connecting a second end of said first lever means to a second end of said second lever means such that when said connecting means is disposed at a first one of said two positions, movement of said second lever means in response to actuation of said engine hood lever is transmitted to said first lever means so as to cause movement of said first lever means for unlocking said engine hood locking means, while when said connecting means is disposed at a second one of said two positions, movement of said second lever means in response to actuation of said engine hood lever is not transmitted to said first lever means so as not to cause movement of said first lever means and said unlocking of said engine hood locking means;
    third lever means having one end operatively coupled to said connecting means for moving said connecting means between said first and second positions;
    means, responsive to locking and unlocking of said door, operatively coupled to a second end of said third lever means for actuating said third lever means in order to move said connecting means to said first one of said two positions when said door is unlocked, and for actuating said third lever means in order to move said connecting means to said second one of said two positions when said door is locked;
    first means for sensing, and generating a first signal indicative of, said disposition of said connecting means at said second one of said two positions;
    second means for sensing, and generating a second signal indicative of, actuation of said second lever means in response to movement of said engine hood lever; and
    means for generating an alarm when said first and second indicative signals are generated.

7. A system as set forth in claim 6, wherein:
    said means actuating said third lever means comprises a solenoid having a plunger connected to said third lever means.

8. A system as set forth in claim 7, wherein:
said first sensing means is disposed within the vicinity of said solenoid so as to detect movement of said plunger.

9. A system as set forth in claim 6, wherein:
said first lever means is pivotable about a pivot pin; and
said second lever means is pivotable about said pivot pin so as to be coaxially pivotable with respect to said first lever means.

10. A system as set forth in claim 9, wherein:
said second lever has a substantially L-shaped slot defined therein comprising a first short leg slot and a second long leg slot disposed at substantially 90° with respect to said first short leg slot;
said first lever has an elongated slot which is of substantially the same length as that of said second long leg slot of said second lever and which overlies said second long leg slot of said second lever so as to extend from the junction of said first short leg slot and said second long leg slot to the opposite free end of said second long leg slot; and
said connecting means comprises a connecting pin disposed within said L-shaped and elongated slots of said second and first levers and movable between said first position defined at said free end of said second long leg slot with respect to said second lever, and said second position defined at said junction of said first short leg slot and said second long leg slot with respect to said second lever.

11. A system as set forth in claim 6, wherein:
said first and second sensing means comprise reed switches.

12. A system as set forth in claim 6, wherein:
said first and second sensing means comprise proximity switches.

13. A theft prevention system for an automobile having a door, an engine hood, means for locking and unlocking said door, means for locking said engine hood, and an engine hood lever for operating said engine hood locking means so as to open said engine hood, comprising:
first lever means having a first end operatively connected to said engine hood locking means;
second lever means having a first end operatively connected to said engine hood lever;
connecting means, movable between two positions, for connecting a second end of said first lever means to a second end of said second lever means such that when said connecting means is disposed at a first one of said two positions, movement of said second lever means in response to actuation of said engine hood lever is transmitted to said first lever means so as to cause movement of said first lever means for unlocking said engine hood locking means, while when said connecting means is disposed at a second one of said two positions, movement of said second lever means in response to actuation of said engine hood lever is not transmitted to said first lever means so as not to cause movement of said first lever means and said unlocking of said engine hood locking means;
means, responsive to locking and unlocking of said door, operatively coupled to said connecting means for moving said connecting means to said first one of said two positions when said door is unlocked, and for moving said connecting means to said second one of said two positions when said door is locked;
first means for sensing, and generating a first signal indicative of, said disposition of said connecting means at said second one of said two positions;
second means for sensing, and generating a second signal indicative of, actuation of said second lever means in response to movement of said engine hood lever; and
means for generating an alarm when said first and second indicative signals are generated.

14. A system as set forth in claim 13, wherein:
said means for moving said connecting means comprises a solenoid having a plunger.

15. A system as set forth in claim 14, wherein:
said first sensing means is disposed within the vicinity of said solenoid so as to detect movement of said solenoid plunger.

16. A system as set forth in claim 13, wherein:
said first lever means is pivotable about a pivot pin; and
said second lever means is pivotable about said pivot pin so as to be coaxially disposed with respect to said first lever means.

17. A system as set forth in claim 13, wherein:
said first and second sensing means comprise reed switches.

18. A system as set forth in claim 13, wherein:
said first and second sensing means comprise proximity switches.

19. A system as set forth in claim 16, wherein:
said second lever has a substantially L-shaped slot defined therein comprising a first short leg slot and a second long leg slot disposed at substantially 90° with respect to said first short leg slot;
said first lever has an elongated slot which is of substantially the same length as that of said second long leg slot of said second lever and which overlies said second long leg slot of said second lever so as to extend from the junction of said first short leg slot and said second long leg slot to the opposite free end of said second long leg slot; and
said connecting means comprises a connecting pin disposed within said L-shaped and alongated slots of said second and first levers and movable between said first position defined at said free end of said second long leg slot with respect to said second lever, and said second position defined at said junction of said first short leg slot and said second long leg slot with respect to said second lever.

* * * * *